Aug. 19, 1952 J. O. FOWLER 2,607,284
APPARATUS FOR TREATMENT OF LIQUIDS IN CONTAINERS
Filed April 10, 1948 5 Sheets-Sheet 1
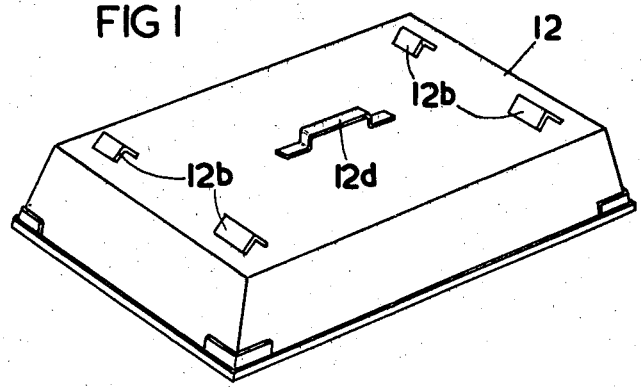
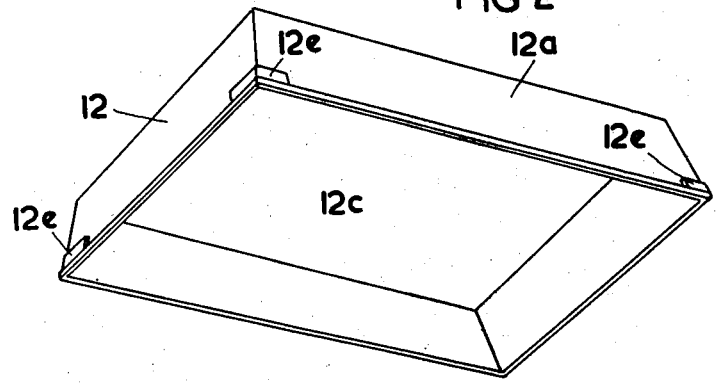
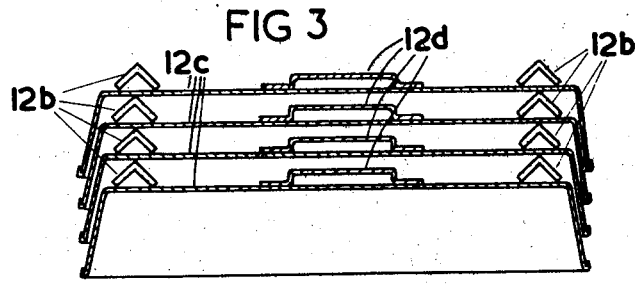

Aug. 19, 1952      J. O. FOWLER      2,607,284
APPARATUS FOR TREATMENT OF LIQUIDS IN CONTAINERS
Filed April 10, 1948      5 Sheets-Sheet 2

Aug. 19, 1952      J. O. FOWLER      2,607,284
APPARATUS FOR TREATMENT OF LIQUIDS IN CONTAINERS
Filed April 10, 1948      5 Sheets-Sheet 3
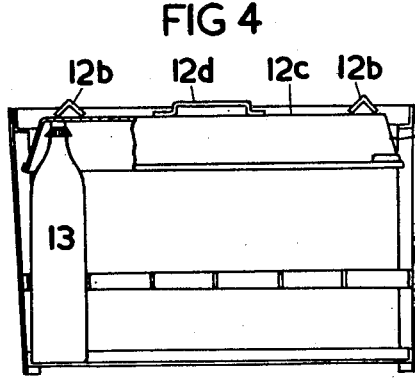
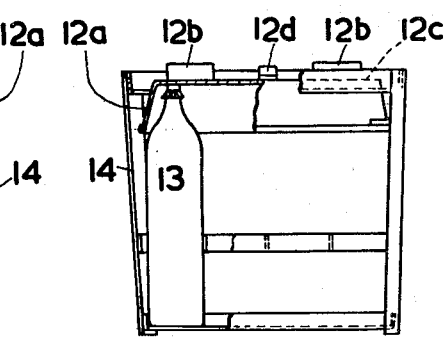
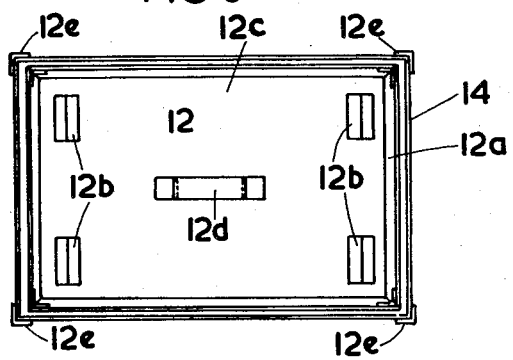
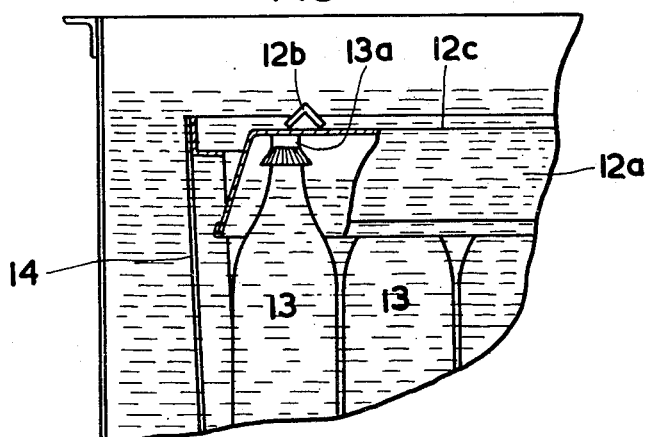

Aug. 19, 1952        J. O. FOWLER        2,607,284
APPARATUS FOR TREATMENT OF LIQUIDS IN CONTAINERS
Filed April 10, 1948        5 Sheets-Sheet 4
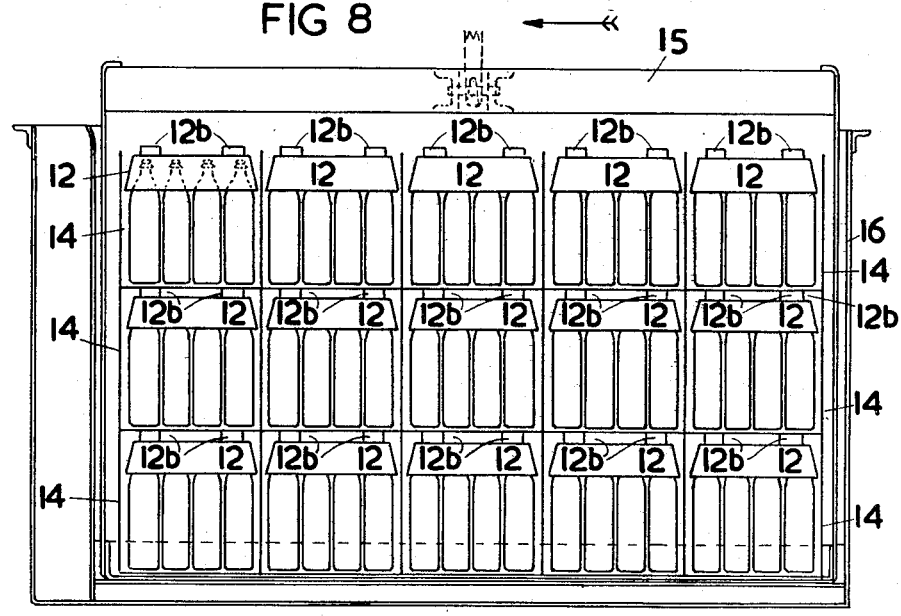
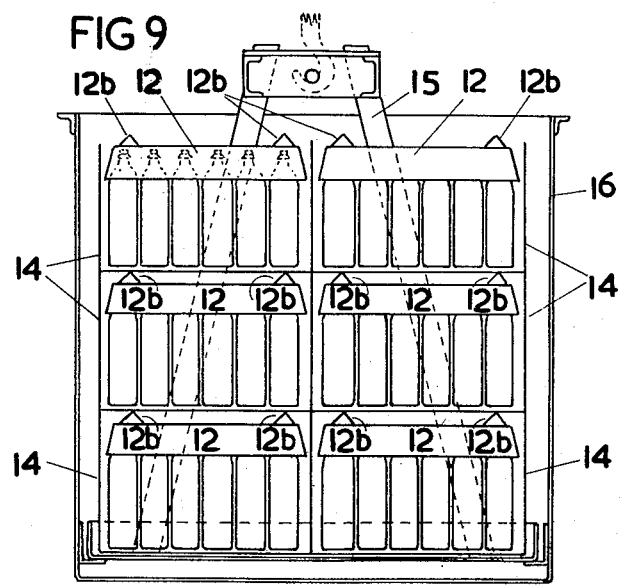

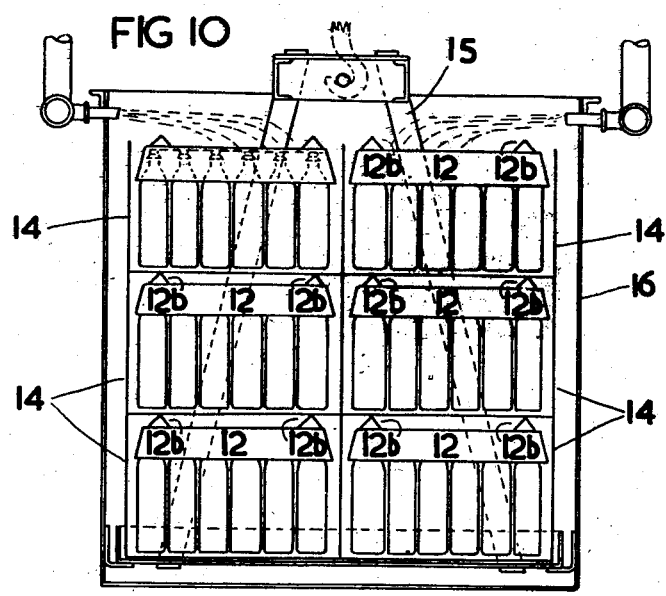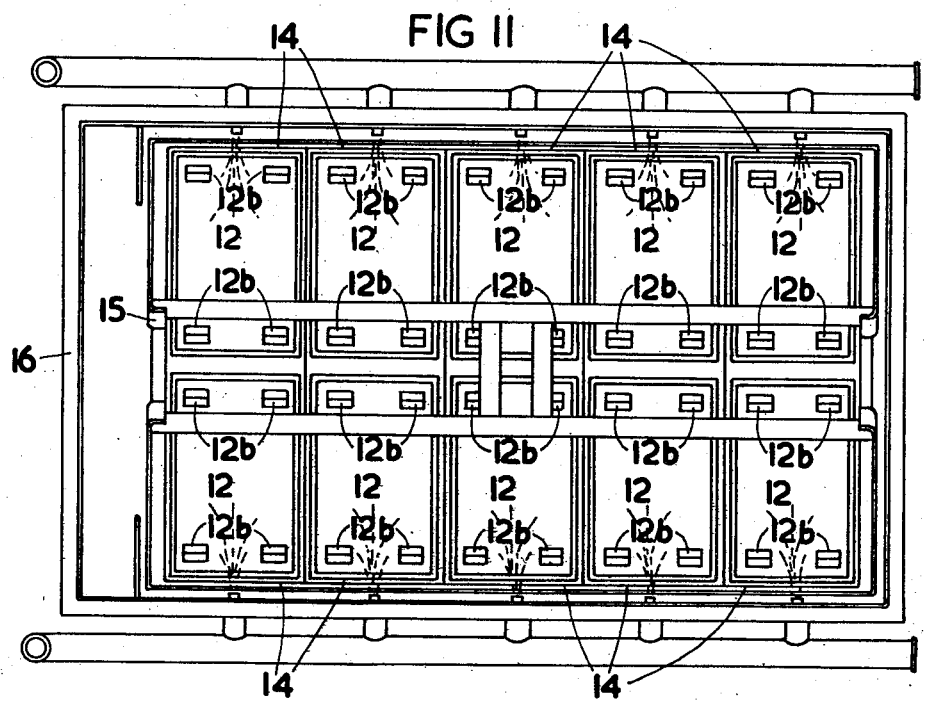

Patented Aug. 19, 1952

2,607,284

UNITED STATES PATENT OFFICE 2,607,284

APPARATUS FOR TREATMENT OF LIQUIDS IN CONTAINERS

James Owen Fowler, Sparkhill, Birmingham, England, assignor to Fowlers Dairy Developments Limited, Sparkhill, Birmingham, England Application April 10, 1948, Serial No. 20,284
In Great Britain January 17, 1948

2 Claims. (Cl. 99—252)

This invention has reference to an improved means for providing an air lock around the mouths of bottles which are required to be immersed in liquid during the treatment of the contents of the bottles and is concerned more particularly with means for providing an air lock around the mouths of bottles of liquid during heat treatment of the liquid by the process described and claimed in the specifications of my pending United States patent applications Serial Number 637,061 filed December 22, 1945, now Patent No. 2,493,663 issued on January 3, 1950, and Serial Number 737,260 filed March 26, 1947, now Patent No. 2,493,664 issued on January 3, 1950.

In order to facilitate a proper appreciation of the invention it is remarked firstly that when capped bottles of liquid which are not sealed hermetically are subjected to cooling by immersion after heating it is found that there is a tendency for the coolant to be sucked into the bottles as cooling takes place and that with a view to overcoming this objection it has been proposed to surround the mouth of a bottle with a bell so as to provide an air lock around the mouth of a bottle when it is immersed, and secondly that in the process described in my prior United States application Serial Number 637,061 filed December 22, 1945, now Patent No. 2,493,663 issued on January 3, 1950, and in the process described in my prior United States application Serial Number 737,260 filed March 26, 1947, now Patent No. 2,493,664 issued on January 3, 1950, the bottles for treatment are packed in standard twenty-four bottle sheet metal crates which are assembled in tiers in a cradle so as to constitute a batch for treatment and that in the process of loading, stacking and unloading the crates are subjected to considerable ill usage.

The present invention has for its object the provision of an improved means for providing an air lock around the mouths of bottles which are required to be immersed in liquid during the treatment of the contents of the bottles which is simple in construction, which facilitates the packing of crates in tiers, which is readily stacked for economy of storage space when not in use, which is capable of withstanding considerable ill usage and which furthermore can be produced at a relatively low cost.

According to the invention the improved means for providing an air lock around the mouths of bottles which are required to be immersed in liquid during the treatment of the contents of the bottles comprises an inverted tray having a flat uninterrupted inside surface adapted to rest on top of the mouths of the bottles in facial contact therewith, said tray being common to and being adapted to envelop the mouths of the whole tier of bottles packed into a crate, and having around the perimeter thereof a flange adapted to depend below the mouths of the bottles whilst on the upper side of the tray there are disposed a plurality of elongated upwardly projecting supports of a height less than the depth of the flange and which afford a substantially line contact when a superposed crate is placed thereon.

The invention also resides in a tray for use with bottles which are required to be immersed during treatment of the contents of the bottles constructed, arranged and adapted for use substantially as will be described hereinafter.

The invention will now be described with particular reference to the accompanying sheets of drawing wherein:

Figure 1 is a perspective view of a tray seen from above.

Figure 2 is a perspective view of a tray seen from below.

Figure 3 is a sectional view of a stacked set of the trays illustrated in Figures 1 and 2.

Figure 4 is a side view partly broken away showing a tray positioned on bottles packed in a milk bottle crate preparatory to treatment in accordance with the processes described in either of my United States Patents 2,493,663 and 2,493,664, dated January 3, 1950.

Figure 5 is an end view also partly broken away of the assembly illustrated in Figure 4.

Figure 6 is a plan of the assembly illustrated in Figure 4.

Figure 7 is a fragmentary view showing the manner in which an air lock is provided when the assembly illustrated in Figures 4–6 is immersed in liquid.

Figure 8 is a fragmentary view illustrating diagrammatically the method of utilising the trays in the processes of heat treating milk and cream in the bottle described in my pending United States patent applications aforesaid.

Figure 9 is a view of Figure 8 looking in the direction of the arrow in the said Figure 8.

Figure 10 is a fragmentary view illustrating diagrammatically the use of the trays for protecting bottles which are required to be subjected to spraying, and Figure 11 is a plan of Figure 10.

In the drawings like numerals of reference indicate similar parts in the several views.

Figure 1A:
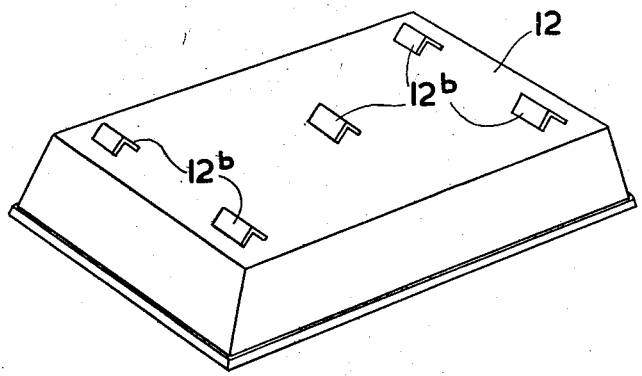
Figs. 1A, 2A and 3A are corresponding views showing a tray of somewhat modified construction.
Figure 2A:
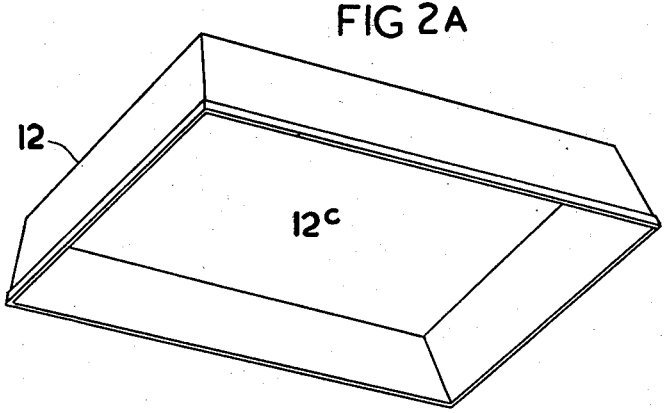
Figure 3A:
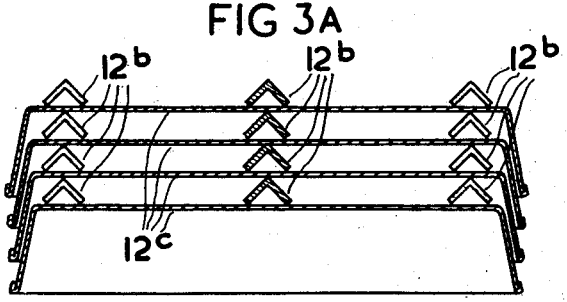

As illustrated in the drawings an inverted tray designated generally by the reference numeral 12 is constructed of sheet steel of a frusto-pyramidal shape and of a size such that when placed on top of the mouths of standard one pint size milk bottles 13 assembled in a standard strip metal twenty-four bottle milk bottle crate 14 the depending and outwardly inclined flange 12a embraces the necks of the bottles 13 to a depth of approximately 3".

Mounted on top of the tray 12 preferably adjacent to each corner is a support 12b in the form of a length of angle iron which is bronze welded to the upwardly presented base 12c of the tray so that the said supports 12b are of an inverted V formation. The supports 12b are preferably not less than 2" in length when used in conjunction with the standard twenty-four bottle milk bottle crate 14 aforesaid.

Also secured to the upper surface of the "base" 12c and at the centre thereof is a sheet metal handle 12d which is spaced from the base 12c at a distance slightly less than the depth of the inverted V supports.

In a convenient construction the tray 12 is fabricated from sheet steel of not less than 22 gauge metal with top dimensions of 16¾" in length and 10½" in width and bottom dimensions of 17¼" in length and 11" in width with a flange depth of 3". The rim of the flange 12a is rolled outwardly to provide for a reinforcement of the rim and at each corner there is provided on the outside and adjacent to the rim a strap 12e of sheet metal of the same gauge as the body of the tray, said straps being spot welded to the tray and serving to prevent opening out or splitting of the tray along the corner lines.

The supports are made of angle iron of ⅛" thickness and are of a length of 2" and a depth of approximately ¾".

The taper of the flange 12a should be such that the distance between the rim of a side and a vertical line dropped from the upper edge of the said side should not be less than ¼" for a flange depth of 3".

The supports 12b and handle 12d and reinforcing straps 12e are first welded to the tray after which the whole assembly is galvanised.

When used in connection with the processes for heat treating milk and cream in the bottle as described in my United States patent applications aforesaid the trays 12 are placed on top of the mouths of the bottles 13 contained within the crates 14 with the undersides of the base 12c seated on the capped mouths 13a of the bottles 13 and with the depending flange 12a surrounding the necks of the whole of the bottles 13 contained within a crate 14. The crates 14 are packed in tiers in a cradle 15 with the bottoms of the succeeding crates 14 resting on the supports 12b of the trays 12 covering the mouths of the bottles 13 in the preceding tier of crates, see particularly Figures 8–10.

Thus when the cradle 15 is immersed in liquid in a tank 16 as shown in Figures 7–9 air is trapped on the underside of the bases 12c and provides the required air lock around the mouths of the bottles 13 which when conditions are suitable prevents air being sucked into the bottles 13 whilst at the same time permitting of the expulsion of air from the bottles during heating, see Figure 7.

If desired the supports 12b may be made of a semi-cylindrical formation.

Although the trays are particularly of use in the case where the crates of bottles are required to be immersed the trays are also useful when the bottles are required to be cooled by spraying jets of water on to the trays covering the topmost tier of crates and allowing the water to drip from the edges of the crates as is illustrated in Figures 10 and 11.

It will be appreciated that the elongated formation of the supports ensures that the bottoms of the crates of a succeeding tier shall be seated on the supports and that the shape of the supports permits the crates to be slid over the trays of a preceding tier during loading and unloading without danger of "catching."

It will be appreciated also that as there are no projections on the "inside" of the tray there is no danger of the caps being perforated or pulled off the bottles during the positioning and removal of a tray.

Further it will be appreciated that the dimensions of the supports prevent wedging of the trays when stacked without at the same time materially increasing the storage space required for any given number of trays when stacked.

In addition it will be appreciated that the construction is such that the trays are capable of withstanding considerable ill usage and of being produced at a relatively low cost.

In conclusion it should be stated that the invention is not limited to use with my processes for the heat treatment of liquids in the bottle but may be employed for providing air locks around the mouths of bottles when immersed where the same problem arises as in the case of my aforesaid processes.

I claim:

1. Apparatus for liquid treatment of liquid housed in a plurality of containers comprising a support adapted to be placed in the treating liquid, a plurality of crates superimposed on each other in said support, a plurality of similar containers vertically arranged in each crate, each container having a mouth at its top, the mouths of the containers in one crate lying in substantially the same horizontal plane, and means for providing an air lock around the mouths of the containers in one crate comprising an inverted tray having a flat uninterrupted inside surface resting on top of the mouths of the containers in a first crate in facial contact therewith, said tray being common to and enveloping the mouths of the whole tier of containers packed into the crate and having around the perimeter thereof a flange depending below the mouths of the bottles, said tray having a plurality of elongated upwardly extending support projections, a second crate positioned above said first crate and on said support projections, said support projections affording a substantially line contact with the second superposed crate thereon.

2. Apparatus as set forth in claim 1, further characterized in that said support projections have a height less than said depending flange.

JAMES OWEN FOWLER.

REFERENCES CITED

The following references are of record in the file of this patent:

UNITED STATES PATENTS

| Number | Name | Date |
|---|---|---|
| 1,144,883 | White | June 29, 1915 |
| 1,186,944 | Rice | June 13, 1916 |
| 1,690,073 | Kincaid | Oct. 30, 1928 |
| 1,898,509 | Taylor | Feb. 21, 1933 |
| 2,154,599 | Beckwith | Apr. 18, 1939 |
| 2,210,521 | Bemis | Aug. 6, 1940 |

FOREIGN PATENTS

| Number | Country | Date |
|---|---|---|
| 10,767 | Sweden | Mar. 10, 1900 |